(12) United States Patent
Suresh et al.

(10) Patent No.: US 10,243,919 B1
(45) Date of Patent: Mar. 26, 2019

(54) RULE-BASED AUTOMATION OF DNS SERVICE DISCOVERY

(71) Applicant: Amazon Technologies, Inc., Seattle, WA (US)

(72) Inventors: Sairam Suresh, North Vancouver (CA); Alireza Farhangi, Vancouver (CA); Sean Henry Lewis Meckley, Seattle, WA (US); Christopher B. Barclay, Seattle, WA (US); Yu Gu, Bellevue, WA (US); Deepak Singh, Issaquah, WA (US); Sharon Shapira, Seattle, WA (US); Pierre Rognant, Toulouse (FR)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 15/279,196

(22) Filed: Sep. 28, 2016

(51) Int. Cl.
| | |
|---|---|
| *G06F 9/455* | (2018.01) |
| *H04L 29/06* | (2006.01) |
| *H04L 29/12* | (2006.01) |
| *H04L 29/08* | (2006.01) |
| *H04L 12/26* | (2006.01) |

(52) U.S. Cl.
CPC ...... *H04L 61/1511* (2013.01); *G06F 9/45558* (2013.01); *H04L 43/10* (2013.01); *H04L 61/2076* (2013.01); *H04L 67/1002* (2013.01); *G06F 2009/45595* (2013.01); *H04L 67/42* (2013.01)

(58) Field of Classification Search
CPC . H04L 61/1511; H04L 61/2076; H04L 67/42; H04L 67/1002; G06F 9/45558; G06F 2009/45595
See application file for complete search history.

(56) References Cited

U.S. PATENT DOCUMENTS

| | | | | |
|---|---|---|---|---|
| 6,286,047 B1 * | 9/2001 | Ramanathan | ..... | H04L 29/12066 370/229 |
| 6,584,502 B1 * | 6/2003 | Natarajan | ........... | H04L 41/0213 709/223 |
| 8,175,089 B2 * | 5/2012 | Hall | .................. | H04L 29/12066 370/389 |
| 9,124,633 B1 * | 9/2015 | Eizadi | ..................... | H04L 61/20 |
| 2009/0037573 A1 * | 2/2009 | Qiu | ..................... | H04L 41/0663 709/224 |

(Continued)

*Primary Examiner* — John M MacIlwinen
(74) *Attorney, Agent, or Firm* — Knobbe, Martens, Olson & Bear, LLP (57) ABSTRACT

Systems and methods are described to enable automation of service discovery records, such as domain name system (DNS) records, based on rules. An administrator of a hosted server, such as a virtual machine instance, may submit a rule to a rule-based DNS resolution system for generating DNS records to assist in discover of the hosted server. The rule may include criteria specifying servers to which the rule applies, as well as criteria for generating a domain name to associate with the server within a DNS record. The rule-based DNS resolution system can integrate with a hosting system providing the hosted server to obtain configuration information of the hosted server and generate DNS records in accordance with the rule. Rules may also be utilized to automate other aspects of the rule-based DNS resolution system, such as health checking and load balancing.

21 Claims, 5 Drawing Sheets

(56) References Cited

U.S. PATENT DOCUMENTS

| | | | | |
|---|---|---|---|---|
| 2009/0144419 A1* | 6/2009 | Riordan | ............ | H04L 29/12066 |
| | | | | 709/224 |
| 2013/0326004 A1* | 12/2013 | Zizka | .................. | H04L 61/1511 |
| | | | | 709/217 |
| 2015/0215276 A1* | 7/2015 | Bhagwat | ............. | H04L 61/2015 |
| | | | | 709/220 |

\* cited by examiner

RULE-BASED AUTOMATION OF DNS SERVICE DISCOVERY

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete or otherwise manage virtual machines in a dynamic matter. In turn, users can request computer resources from a data center, including single computing devices or a configuration of networked computing devices, and be provided with varying numbers of virtual machine resources.

In some instances, multiple computing devices (e.g., virtual computing devices) can work in concert to provide a network-accessible service, such as a web site. The number of computing devices providing the service may be varied based on a demand for the service. For example, a highly demanded service can be implemented by a greater number of computing devices, and a less demanded service can be implemented by fewer computing devices. In some instances, the number of computing devices used to implement a service can be varied automatically or programmatically in response to demand. Illustratively, as demand for a service rises, additional computing can be used to implement the service, and as demand falls, computing devices can be decommissioned from the service.

Because the number of computing devices implementing a service may vary, technologies exist to enable client devices to discovery those computing devices. One example of such a technology is the domain name system (DNS), which enables client devices to retrieve, from DNS servers, network addresses for computing devices corresponding to an identifier (e.g., a domain name or a universal resource indicator, or URI). Illustratively, for a web service corresponding to a domain name, client devices may utilize DNS services to determine network addresses for computing devices implementing that web service.

DETAILED DESCRIPTION

Generally described, the present disclosure relates to facilitating discovery of network-accessible services by implementing rule-based automation for the creation and management of service discovery records. More specifically, the present disclosure relates to systems and methods that enable domain name system (DNS) records, or other service discovery records, to be automatically created, maintained, or deleted, based on a configuration of servers identified within the DNS records. Further, the present disclosures enables automated verification and garbage collection for such DNS records, to allow for error handling on instances where events are not properly processed (e.g., due to error in network communications). Advantageously, the present disclosure enables automated creation and maintenance of DNS records without requiring interaction with (or knowledge of) the servers identified within the DNS records. Specifically, embodiments of the present disclosure may provide a rule-based DNS automation system configured to receive and process event notifications from a management component of a server, such as a hosting system providing the server, to automatically create, modify, or delete DNS records related to the server as appropriate, given any changes to configuration of the server. The actions required by changes in configuration may be specified, for example, by an administrator of the server. Illustratively, an administrator may specify that when a new server becomes available (e.g., as a new virtual machine instance) acting as an endpoint for a given network-accessible service, that a new DNS record for that network-accessible service should be created identifying a network address of the server. In one embodiment, the DNS record may be formatted such that it identifies the network-accessible service. For example, the DNS record for a database service may include the term "database," along with other identifying information of the service, such as a domain associated with the database. Thus, rather than manually specifying DNS records as new database servers are created, the rule-based DNS system may automatically detect new database servers added to a network and generate DNS records identifying the new database servers, thereby enabling access to the servers based on pre-determined identifying information (e.g., a subdomain of "database"). The present disclosure therefore facilitates automatic management of service discovery.

Generally described, service discovery systems function to enable client devices to discover identifying information, such as network addresses, for computing devices implementing such a network-accessible service. However, these service discovery systems often operate with little or no automation, such that as new devices or services are brought online and connected to a network, an administrator must manually create a service discovery record for the new device or service. While past attempts have been made to automate service discovery, these past systems generally require agent software to be executing on a device providing a service. For example, a device executing a Linux operating system (OS) and providing a database service may also execute agent software within the Linux OS, to notify a service discovery system (e.g., a DNS server) of the state of the database service. These agent-based approaches are problematic for multiple reasons. One problem is that of compatibility, as agent software must generally be compatible with an operating system executing by a device, and appropriate agent software may not be available for all operating systems, particularly embedded systems. Another problem is that these agent systems require computing resources of a service-providing device. Yet another problem is that these agents are susceptible to failures of a service-providing device itself. For example, if a device shuts down unexpectedly or loses network communications, a service discovery (e.g., DNS) record for the device may continue to exist, potentially causing errors to end users attempting to discover the service. Still further, and due in part to the limitations discussed above, these agent-based systems often lack flexibility in the type of service discovery records that can be created or management by the agent.

The present disclosure addresses these issues by providing rule-based DNS management, whereby a DNS resolution system can be configured to monitor a state of one or more servers, and to automatically modify DNS records identifying those servers based on rules established, for example, by an administrator of the server. In one embodiment, these servers may correspond to virtual machines, and the DNS resolution system may communicate with a hosting system configured to generate and manage the virtual machines. Specifically, the DNS resolution system may query the hosting system for a current configuration of one or more virtual machines, and automatically generate DNS records for services provided by the virtual machines. Thereafter, the DNS system may communicate with the hosting system to receive notifications when changes to the configuration of the virtual machines occur, such as a virtual machine being created, destroyed, or modified. The DNS system may then make changes to corresponding DNS records, as necessary to maintain compliance with the rules. Thus, the DNS system may maintain up-to-date DNS records for the servers, without requiring manual maintenance of the records and without requiring software executing on the servers themselves (or indeed, any knowledge on the part of the servers at all).

As an illustrative example, consider an administrator that maintains a set of virtual machines, at a hosting system, providing a database service. The administrator may be associated with a specific domain name, such as "reliabledbs.tld." Further, the administrator may wish to implement a naming scheme whereby each virtual machine on the hosting system is associated with a different subdomain of the "reliabledbs.tld" domain name. For example, the administrator may wish to associate the first virtual machine with the fully qualified domain name (FQDN) of "db1.reliabledbs.tld," the second virtual machine with the FQDN of "db2.reliabledbs.tld," and so on. In accordance with the present disclosure, the administrator may notify a rule-based DNS system of a rule, specifying that a DNS record should be created for each virtual machine, identifying a network address of that virtual machine by reference to a subdomain to "reliabledbs.tld," the subdomain formatted as a concatenation of the letters "db" and a number of the virtual machine with the set of virtual machines. Thereafter, as virtual machines are added or removed from the set of virtual machines, the rule-based DNS server may automatically update DNS records in accordance with the rule, such that for each virtual machine running, a DNS record is created identifying the network address of the virtual machine under a FQDN formatted as "dbN.reliabledbs.tld," where N represents a number of the virtual machine within the set.

Advantageously, the rules by which DNS records are created may reference a variety of parameters associated with a target device (e.g., a device whose network address is identified within a DNS record). For example, where the target device is a virtual machine instance created within a hosting system, a rule may reference an identifier of the virtual machine instance, such as an identifier provided by the hosting system, a computer name, a locally-assigned machine name, etc., a service image (e.g., a collection of software) used to create the virtual machine instance, a creation time of the virtual machine instance, a location of the virtual machine instance (e.g., a geographic region, a logical region assigned by the hosting system, etc.), one or more tags associated with the virtual machine instance, port numbers associated with services provided by the virtual machine instance, resource identifiers (such as text string identifiers) for services provided by the virtual machine instance, or any other information provided by the hosting system regarding the virtual machine instance. Any of these parameters may be utilized, independently or in combination, to generate a DNS record for the virtual machine instance. For example, virtual machines associated with a first service image (e.g., for providing access to a database) may be associated with a first subdomain (e.g., "databases"), while virtual machines associated with a second service image (e.g., for providing web hosting) may be associated with a second subdomain (e.g., "www"). Virtual machines within a first geographic region may be associated with a first subdomain (e.g., "USEast"), while virtual machines within a geographic region may be associated with a second subdomain (e.g., "USWest"). These subdomains may be combined according to defined rules, for example, such that each database in the U.S. East region is associated with a domain name formatted as "X.databases.USEast.domain.tld" while each web hosting system in the U.S. West region is associated with a domain name formatted as "Y.www.USWest.domain.tld," where X and Y represent distinct information for each virtual machine (e.g., a consecutively assigned number, a unique identifier, etc.). In some embodiments, multiple virtual machine instances may be assigned to the same domain name (e.g., such that all databases are associated with a DNS record for "databases.USEast.domain.tld"). For example, the rule-based DNS system may respond to requests to access that shared domain name by responding with network addresses of all virtual machines associated with the domain name, or by selecting network address for a subset of those virtual machine instances (e.g., according to a load-balancing protocol, examples of which are known in the art). Further, in some embodiments, multiple DNS records may be created for a single virtual machine. For example, two DNS records may be created for a virtual machine that identify the same network address according to different domain name formats (e.g., to allow for backwards compatibility with deprecated domain name formats). As another example, two DNS records may be created for a virtual machine that identify different network addresses of the virtual machine. Illustratively, a first DNS record may point to a primary network interface of the virtual machine, while a second DNS record may point to a management network interface of the virtual machine (e.g., to allow for service discovery of management interfaces). In some instances, rules may specify criteria for selecting other network access information, such as port number or resource identifier. Illustratively, a first DNS record may point to a first port of a network interface of a virtual machine, while a second DNS record may point to a second port of that same network interface. Where a DNS record identifies the endpoint via network address information other than an IP address, such as by a resource identifier, such network address information may be included, for example, within a text-based string (e.g., by use of a 'TXT' type DNS record). In addition to or as an alternative to specifying a domain name and the network access information to which the domain name should be mapped, a rule may specify other attributes of a DNS record, such as a time-to-live (TTL) value for the record. Thus, the rule-based DNS resolution system described herein can enable any number of DNS records to be created for any number of devices.

When a rule is created for a set of devices, the rule-based DNS resolution system may obtain configuration information for the set of devices, and implement the rule as necessary. Illustratively, the rule-based DNS resolution system may communicate with a hosting system to obtain a current configuration for any virtual machines to which the rule may apply (e.g., virtual machines associated with a user that created the rule). Thereafter, the rule-based DNS resolution system may process the configuration information against the rule, to create DNS records as necessary according to the rule. In one embodiment, the rule-based DNS resolution system may also verify that any other rules applicable to the relevant virtual machines are up-to-date. For example, the rule-based DNS resolution system may verify that all network addresses identified within a set of relevant DNS records (e.g., DNS records associated with the set of virtual machines for which configuration information was maintained) are also identified in the configuration information. In the instances that a mismatch exists between network addresses identified within current DNS records and those identified in the configuration information, the rule-based DNS resolution system may consider all current DNS records as expired, and re-run all applicable rules against the configuration information, to regenerate DNS records for the relevant virtual machines. In some embodiments, each DNS record may be tagged with one or more rule identifiers, indicative of the rule or rules specifying that the DNS record should be created. Thus, on deletion of a rule, the rule-based DNS resolution system may also delete and DNS records tagged only with an identifier of the deleted rule, and remove the identifier of the deleted rule from the tags of all DNS records, in order to remove all deprecated records associated with the deleted rule.

To ensure that DNS records within the rule-based DNS resolution system stay up to date, the rule-based DNS resolution system may also periodically retrieve configuration information regarding relevant devices and verify that configuration information against a current set of rules. The periodicity by which configuration is retrieved can vary according to specific embodiments. For example, some systems may retrieve configuration information to verify rules on the order of tens of minutes, while other systems may retrieve configuration information to verify rules on the order of hours or days. It may be desirable to minimize how often the rule-based DNS resolution system retrieves configuration information to verify rules, since this process may utilize resources of both the rule-based DNS resolution system and a hosting system providing the devices identified in the DNS records. Accordingly, in addition or as an alternative to periodically retrieving configuration information for devices, the rule-based DNS resolution system may communicate with a hosting system for the devices to obtain notifications on changes to the configuration of those device (referred to herein as "configuration events" or simply "events"). Illustratively, as changes to the configuration of devices within a hosting system occur, the hosting system may notify the rule-based DNS resolution system of those events. The rule-based DNS resolution system may then determine any changes appropriate to the DNS records based on the event, based on rules corresponding to the device whose configuration has changed. For example, where a new virtual machine is created, associated with a first user account, the rule-based DNS resolution system may determine whether any rules of the first user account would require generation of a new DNS record (or modification of an existing DNS record) identifying a network address of the new virtual machine. Where a virtual machine is deleted, the rule-based DNS resolution system may delete network address information of the virtual machine from any DNS records, or delete DNS records including only network address information of the virtual machine. Where a virtual machine's configuration is modified, the rule-based DNS resolution system may determine any out-of-date records (e.g., records created according to a prior configuration) and modify or delete the out-of-date records to remove network address information of the virtual machine. The rule-based DNs resolution system may further create any new records as required by the designated rules and the new configuration.

While some descriptions provided herein reference virtual machine instances as a device providing a network-accessible service, embodiments of the present disclosure may enable automated management of DNS records corresponding to any device, virtual or physical, based on configuration information obtained by a hosting system managing the device. In some embodiments, DNS records may be automatically managed according to event notifications from sources other than a hosting system. For example, a user may establish rules for automated DNS record management based on events occurring with a Rich Site Summary (RSS) stream or other event source. In still more instances, rules may automate not just creation and management of DNS records, but other functionalities of the rule-based DNS resolution system or associated systems. For example, where a rule-based DNS resolution system implements health checking as a mechanism to detect failed communications or devices, rules may establish how such health checking occurs for any new devices. Thus, the rule-based DNS management described herein can be utilized to automate nearly all aspects of service discovery.

As will be appreciated by one of skill in the art in light of the present disclosure, the embodiments disclosed herein improves the functionality of computing systems implementing service discovery for network-accessible services. Specifically, the embodiments disclosed herein provide for service discovery systems to automatically adapt service records based on a configuration of devices providing network-accessible services, resulting in a reduction of errors and an increase in accuracy of service discovery records. The presently disclosed embodiments therefore address technical problems inherent within computing systems; specifically, the difficulty in maintaining accurate discovery records for dynamic services, where devices providing network-accessible services may vary with high frequency. These technical problems are addressed by the various technical solutions described herein, including the implementation of a rule-based DNS resolution system to monitor configuration of devices providing network-accessible services and to automatically update service records for such services based on rules established, e.g., by an administrator of the devices. Thus, the present disclosure represents an improvement on existing virtual network systems and computing systems in general.

Figure 1:
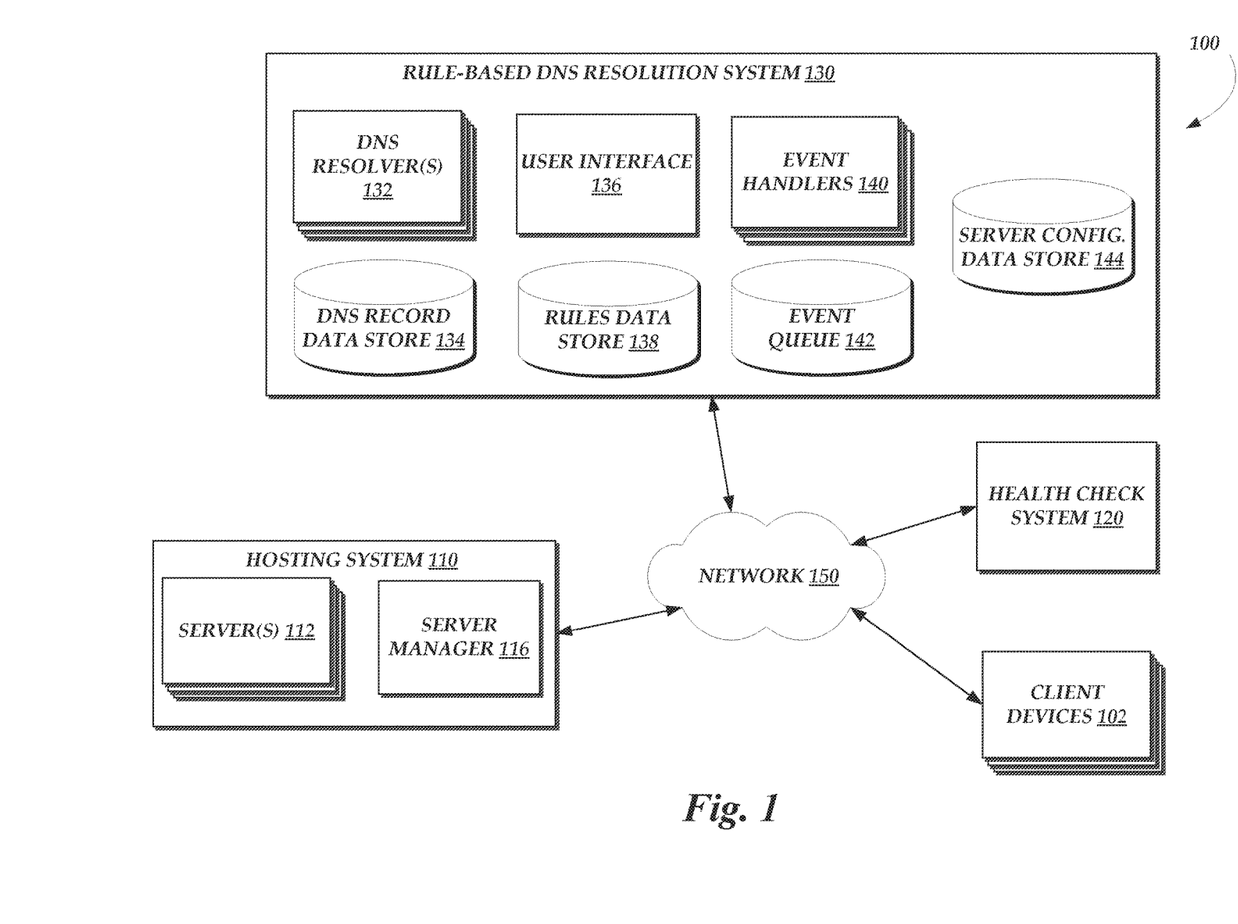
FIG. 1 is a block diagram of an illustrative network environment including client devices, a hosting system including servers hosting web services, a health check system monitoring the health of the servers, and a rule-based DNS resolution system enabling discovery of the servers based on DNS records that may be automatically created and maintained based on designated rules.

With reference to FIG. 1, a block diagram showing a simplified logical environment 100 will be described in which client devices 102, a hosting system 110, a health check system 120, and a rule-based DNS resolution system 130 may interact via a network 150.

Network 150 may be any wired network, wireless network, or combination thereof. In some instances, network 150 may be a telecommunications network, such as a personal area network, local area network, wide area network, cable network, satellite network, cellular telephone network, or combination thereof operating via the internet protocol (IP). In other instances, the network 150 may be or may include other network types, such as television networks or radio networks. In the example environment of FIG. 1, network 150 is a global area network (GAN), such as the Internet. Protocols and components for communicating via the other aforementioned types of networks are well known to those skilled in the art of electronic communications and thus, need not be described in more detail herein. While each of the client devices 102, hosting system 110, health check system 120, and rule-based DNS resolution system 130 is depicted as having a single connection to the network 104, individual elements of the client devices 102, hosting system 110, health check system 120, and rule-based DNS resolution system 130 may be connected to the network 150 at disparate points. Accordingly, communication times and capabilities may vary between the components of FIG. 1. While shown in FIG. 1 as a single network, the network 150 may represent different networks interconnecting the different components of FIG. 1. For example, the network 150 may represent a first network (e.g., the Internet) that interconnects the client devices 102 to the a second, private network (not shown in FIG. 1) shared between the hosting system 110, health check system 120, and rule-based DNS resolution system 130.

Client devices 102 may include any number of different devices configured to interact with the hosting system 110 or other elements of FIG. 1, to access network-accessible services provided by FIG. 1, and to configure operation of the hosting system 110, health check system 120, and rule-based DNS resolution system 130. For example, individual client devices 102 may correspond to computing devices, such as a laptop or tablet computer, personal computer, wearable computer, server, personal digital assistant (PDA), hybrid PDA/mobile phone, mobile phone, electronic book reader, set-top box, camera, digital media player, and the like. Each client devices 102 may include hardware and/or software enabling communication via the network 150.

The hosting system 110 includes a plurality of servers 112 providing a network-accessible services, such as a web sites or databases (among many other possible network-accessible services, myriad examples of which are known in the art). Each server 112 may be implemented on behalf of a client, e.g., associated with a client device 102, and may be associated with an account of that client on the hosting system 110. In some instances, one or more servers 112 may be logically grouped into a pool, and operate to collectively implement a network-accessible service.

Illustratively, each of the servers 112 may correspond to a virtual machine instance implemented by an underlying physical host computing device (not shown in FIG. 1) and configured with an operating system and software to implement a network-accessible service. In other instances, one or more servers 112 may correspond to a physical computing device. In still other instances, one or more servers 112 may correspond to other virtualizations or logical execution environments within a physical computing device, such as a software container executing within an operating system of a physical computing device. Each server 112 may be accessible over the network 150 via one or more network addresses, such as Internet Protocol (IP) version four (IPv4) or version six (IPv6) addresses. In one embodiment, each server 112 maintains a distinct network address. In another environment, one or more servers 112 share a network address (e.g., via anycast routing mechanisms). While not shown in FIG. 1, the hosting system 110 may include additional components enabling servers 112 to collectively provide access to a service, such as load balancing components, network routing components, etc. Such components are known in the art, and therefore will not be described in detail herein.

The hosting system 110 further includes a server manager 116 configured to control operation of the servers 112. The server manager 116 may, for example, be configured to generate servers 112 (e.g., as virtual machine instances) or otherwise load computing devices with the requisite software or configurations needed to operate as part of the pool 114. The server manager 116 may further be configured to monitor the health or resource usage of servers 112, such as by monitoring computing resources used by the servers 112, monitoring for critical failures of the servers 112, etc. In accordance with embodiments of the present disclosure, the server manager 116 may operate to automatically provide notifications regarding changes in configuration of the servers 112, due either to automated management (e.g., scaling to account for load, deletion of failed servers, etc.) or manual intervention of a client device 102 (e.g., to manually create a new server 112). In one embodiment, the hosting system 110 may directly notify the rule-based DNS resolution system 130 as changes to configuration of the servers 112 occurs. In another embodiment, the hosting system 110 utilizes an external message queuing service (not shown in FIG. 1) to store such notifications, and enable subscribing devices to access notifications regarding changes in configuration of the servers 112.

As noted above, the various servers 112 are associated with network addresses, through which services provided by the servers 112 may be accessed (e.g., by client devices 102). In many instances, it is undesirable to require a client device 102 to maintain knowledge of the network addresses of the servers 112. Thus, the environment 110 further includes a rule-based DNS resolution system 130 that aids in discovery of network addresses based on other identifiers, such as domain names or URIs. The rule-based DNS resolution system 130 may implement functions common to traditional DNS, which is known in the art. The rule-based DNS resolution system 130 can further include DNS resolvers 134 configured to receive requests (e.g., from client devices 102) for DNS records corresponding to an identifier (e.g., domain name, URI, etc.) and return relevant records to a requesting device. These records may be stored within a DNS record data store 136, and may generally include a mapping of a domain name or other identifier to one or more corresponding network addresses or other identifying information of a network endpoint corresponding to the domain name (e.g., a string-based resource identifier or other text record, port numbers, protocols, etc.). In this manner, the DNS resolvers can enable client devices 102 to discover network addresses or other DNS information corresponding to an identifier. For example, where a server 112 is configured to host a web site associated with the domain name "www.example.tld," the DNS resolvers 134 may obtain DNS requests corresponding to that domain name, and return a network address associated of the server 112. In one embodiment, DNS resolvers 134 may return DNS records including network addresses of each server 112 associated with a domain name. In another embodiment, DNS resolvers 134 may return DNS records including network addresses of only one or more servers 112 associated with a requested domain name. Such servers 112 may be selected, for example, according to load distribution or balancing techniques (e.g., round robin, random selection, load-based selection, etc.).

Under prior systems, DNS records are often generated manually. For example, where a server 112 is implemented on the hosting system 110 on behalf of a client, that client, under a prior DNS system, may manually generate a DNS record creating an association between a domain name and the network address of the server 112. Such manual generation can be difficult to manage, cumbersome to clients, and in many cases error prone, as DNS records are not automatically updated due to changes in configuration of the servers 112. These issues become especially problematic in hosted environments where servers 112 are rapidly deployed and configured, as may be represented by the hosting system 110. Some prior systems attempt to address these issues by use of software-based agents executing on the servers 112. However, as described, such agents are problematic in that they require a compatible operating system to be executing on a server 112, utilize computing resources of the server 112, and cannot address failures in the server 112 (e.g., network failure or machine failure).

To address these issues in a robust manner, that enables automatic DNS record generation and maintenance without requiring execution of specialized software on the server 112 (or indeed, any knowledge by the server 112 at all), the rule-based DNS resolution system 130 described herein can enable client devices 102, associated with servers 112 on the hosting system 110, to specify rules by which DNS records can be automatically created, maintained, or destroyed, based on a configuration of the servers 112. Specifically, the rule-based DNS resolution system 130 can include a user interface 136 through which users may specify rules for managing DNS records of servers 112, a rules data store 138 for storage of those rules, one or more event handlers 140 for processing configuration information of the hosting system to manage DNS records based on those rules, an event queue 142 to store records of events occurring at the hosting system 110 regarding changes in the configuration of the servers 112, and a server configuration data store 144 to store information regarding a last known configuration of the servers 112. The user interface 136 and event handlers 140 may be implemented, for example, by one or more computing devices including processors and memory configured to undertake the functionalities described herein. While shown separately from the hosting system 110, in some embodiments, the user interface 136 and event handlers 140, along with other components of the rule-based DNS resolution system 130, may be implemented by servers 112 of the hosting system 110 (e.g., as virtual machine instances). The rules data store 138, the event queue 142, and server configuration data store 114 may correspond to any persistent or substantially persistent data storage, such as a hard drive (HDD), a solid state drive (SDD), network attached storage (NAS), a tape drive, or any combination thereof. The rules data store 138, the event queue 142, and the server configuration data store 114 may be implemented directly by a physical storage device, or may be implemented by a virtualized storage device that is in turn implemented on an underlying physical storage device. In some instances, one or more components of the rules-based DNS resolution system 130 may be implemented by an external service (not shown in FIG. 1). For example, the event queue 142 may be implemented at least in part by a messaging service, examples of which are known in the art. Functionalities of the rule-based DNS resolution system 130 will be described in more detail with reference to FIGS. 3 and 4, below.

In some instances, servers 112 providing a service may become unreachable, unreliable, or otherwise unhealthy due to problems at the server 112, on the network 150, etc. In these instances, it is generally undesirable for the rule-based DNS resolution system 130 to continue to associate the service with those unreliable or unreachable servers 112. To identify servers 112 that have become unhealthy, the environment 100 includes a health check system 120. While not shown in FIG. 1, the health check system 120 can include a health check manager, one or more health check servers, and a configuration data store. Each component of the health check system 120 may correspond to a physical computing device, or may be implemented as a virtual device. Within the health check system 120, the health check servers can function to generate health check data and transmit that health check data to a destination server 112 to verify the health of that server 112 in providing a service. Health check data can include, for example, network packets formatted to elicit an expected response from a health check target, such as Internet Control Message Protocol [ICMP] echo packets, hypertext transport protocol [HTTP] request packets, etc. In the instance that the servers 112 function to host a web site, health check data may include HTTP request packets expected to result in a response with an appropriate HTTP status (e.g., HTTP 200 status). Further description regarding the health check system 120 can be found within U.S. application Ser. No. 15/269,822, entitled "INTEGRATION OF SERVICE SCALING AND SERVICE DISCOVERY SYSTEMS," and filed Sep. 19, 2016 (the "'822 application"), and U.S. application Ser. No. 15/269,829, entitled "INTEGRATION OF SERVICE SCALING AND EXTERNAL HEALTH CHECKING SYSTEMS," and filed Sep. 19, 2016 (the "'829 application"), the entireties of which are hereby incorporated by reference. In accordance with embodiments of the present disclosure, operation of the health check system 120 may in some instances be controlled by rules, as stored within the rules data store 138. Illustratively, rules may, for a given server 112 within the hosting system 110 the type of health check data that should be transmitted to the server 112, the frequency that the health check data should be transmitted, criteria by which a response from the server 112 should be evaluated (e.g., as a valid or invalid response), and criteria under which the server 112 should be designated as failed (e.g., based on a threshold number of valid or invalid responses over a specified period of time).

Figure 2:
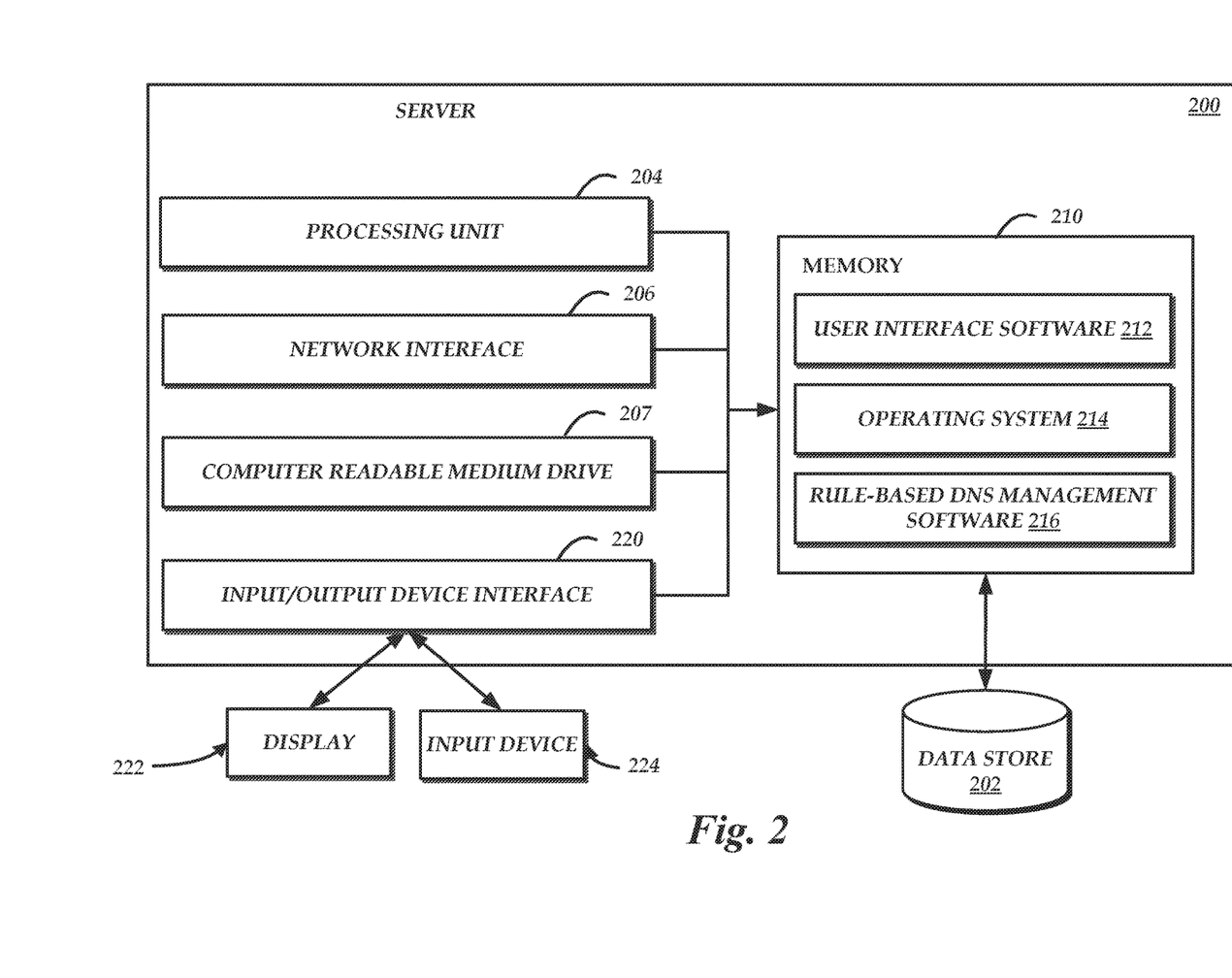
FIG. 2 is a block diagram depicting an illustrative configuration of one embodiment of a server than may provide rule-based DNS management.

FIG. 2 depicts one embodiment of an architecture of a server 200 that may implement an event handler 140 of the rule-based DNS resolution system 130 or other components described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 222, and an input device 224, all of which may communicate with one another by way of a communication bus. The network interface 206 may provide connectivity to one or more networks or computing systems, such as the network 150 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes random access memory (RAM), read only memory (ROM) and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. These user interfaces may correspond, for example, to the user interface 136 of FIG. 1, and may enable client devices 102 to specify and submit rules for inclusion to the rules data store 138, which rules may control the management of DNS records within the DNS record data store 134 according to a configuration of the hosting system 110. In addition, memory 210 may include or communicate with one or more auxiliary data stores, such as data store 202, which may correspond to any persistent or substantially persistent data storage, such as a hard drive (HDD), a solid state drive (SDD), network attached storage (NAS), a tape drive, or any combination thereof. Illustratively, the data store 202 may correspond to the rules data store 138, the DNS record data store 134, the event queue 142, or any combination thereof.

In addition to the user interface module 212, the memory 210 may include rule-based DNS management software 216 that may be executed by the processing unit 204. In one embodiment, the rule-based DNS management software 216 implements various aspects of the present disclosure, e.g., the creation, modification, and deletion of DNS records based on configuration of servers, the handling of events regarding changes to configuration of the servers, the periodic refreshing of the DNS records, etc.

Figure 3:
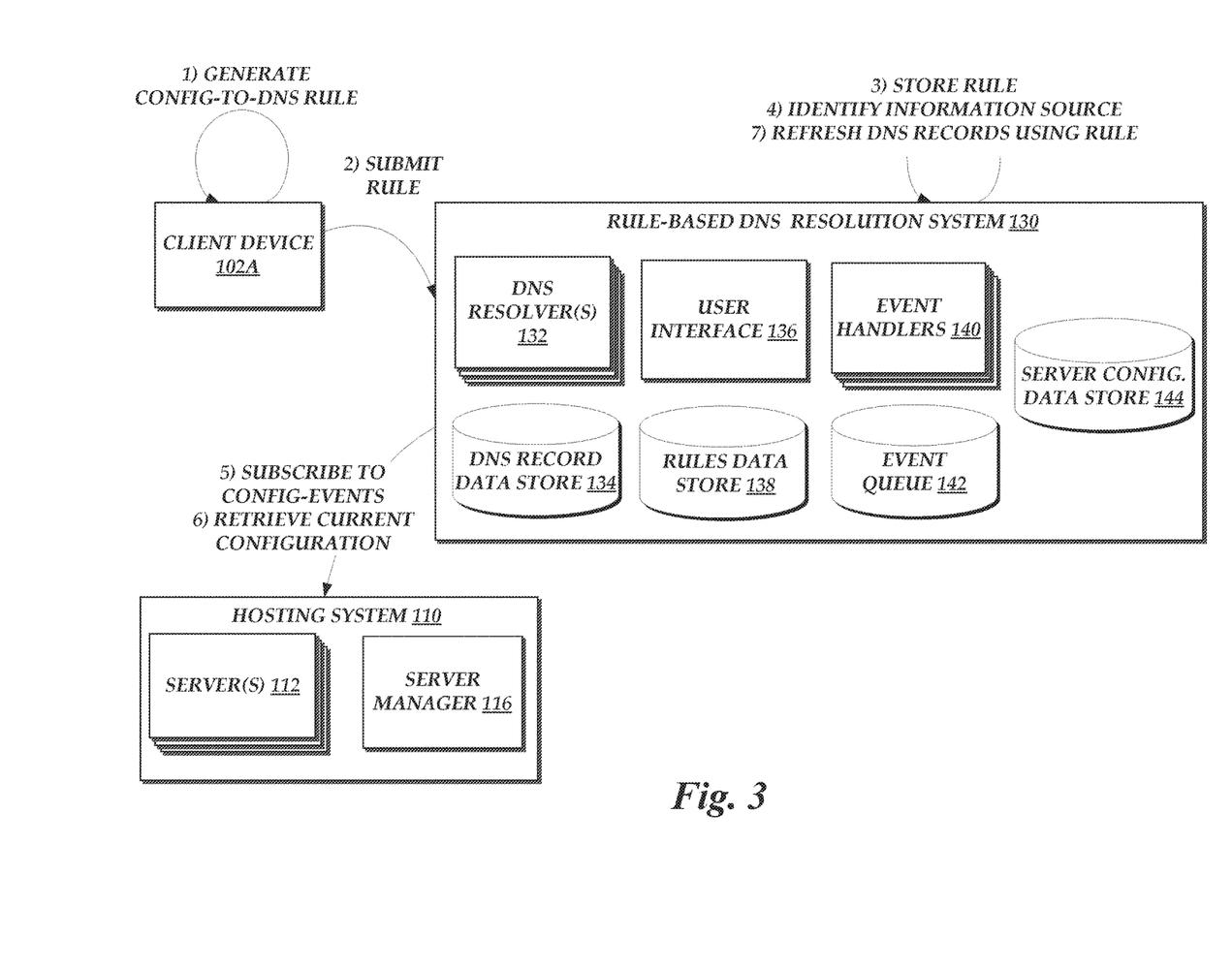
FIG. 3 is a block diagram depicting illustrative interactions to establish DNS management rules based on configuration information related to servers within a hosting system.

With reference to FIG. 3, a set of illustrative interactions will be described for creation of a rule at the rule-based DNS resolution system 130 to manage DNS records corresponding to one or more servers 112. Illustratively, a submitted rule may be created by a client device 102A, associated with a client or user for whose benefit one or more servers 112 have been implemented at the hosting system 110. While the hosting system 110 and rule-based DNS resolution system 130 may function to implement servers 112 and maintain DNS records, respectively, for any number of clients, the interactions of FIG. 3 will be described with reference to a single client device 102A, servers 112 associated with the client device 112, and corresponding DNS records at the rule-based DNS resolution system 130.

The interactions of FIG. 1 begin at (1), where a client device 102A generates a "config-to-DNS" rule, which specifies the format of one or more DNS records based on a configuration of a server 112 at the hosting system 110. In one embodiment, the rule may be generated at the client device 102A with the aid of the rule-based DNS resolution system 130 (e.g., by interaction with a user interface generated at the client device 102A based on instructions provided by the rule-based resolution system 130). In another embodiment, the rule may be created independently by the client device 102A. For example, the rule may be formatted according to a given standard, such as the extensible markup language (XML) format, and the client device 102A may generate a rule based on input from a client formatted in accordance with that standard. Illustratively, a rule may include one or more criteria defining servers 112 to which the rule applies, as well as one or more criteria defining a domain name that should be associated with a network address of the servers 112. Each criterion may reference one parameter associated with a configuration of the server 112, or multiple parameters (e.g., joined via Boolean logical connectors, such as AND or OR). For example, a criterion may specify that a rule applies only to servers 112 executing in a specific region, executing a specific service image (e.g., software used to generate the server 112), executing a specific version of that service image, etc. Additional criterion may specify, for a server 112 to which the rule applies, the domain name that should be associated with the server 112 within a DNS record. The domain name may be static (e.g., "databases.domain.tld"), variable (e.g., "[identifier].[region].domain.tld," where [identifier] is a machine name of server 112 and [region] is a region in which the server operates), or a combination thereof. In some instances, one or more criteria may be automatically associated with or included within a rule by the rule-based DNS resolution system 130. For example, the rule-based DNS resolution system 130 may automatically append a top-level domain associated with the client device 102A to all domain names, and may automatically consider a rule submitted by the client device 102A as applicable only to servers 112 associated with the client device 102A. Thus, these criterion may not be required to be specified within a rule.

In some instances, rules may specify additional information to control operation of the rule-based DNS resolution system 130. For example, a rule may specify criterion by which to select a network address of a server 112 to be included in a DNS record. As a further example, rules may specify how health checks should be applied to servers 112 corresponding to the rule (e.g., what health check data should be transmitted, how responses should be evaluated, how health of the server 112 should be determined, how often health check data should be transmitted, etc.). As yet another example, rules may specify how DNS records for a corresponding server 112 should be utilized to implement load balancing for the server 112 (e.g., as a weighting of the server 112 among all servers 112 associated with a domain name).

At (2), the client device 102A submits the rule to the rule-based DNS resolution system 130. In one embodiment, the client device 102A submits the rule via a web-based user interface (e.g., the same interface used to create the rule). In another embodiment, the client device 102A submits the rule via another graphical user interface (GUI) or a command line interface (CLI). In yet another embodiment, the client device 102A submit the rule by uploading a structured file (e.g., an XML file) including the rule to the rule-based DNS resolution system 130. While submission of a single rule is described with reference to FIG. 3, a client may submit any number of rules to the rule-based DNS resolution system 130, separately or as a collection. At (3), the rule-based DNS resolution system 130 (e.g., via the user interface 136) stores the rule within the rules data store 138. In some instances, the rule-based DNS resolution system 130 may validate the rule prior to storage, such as to ensure that the client device 102A has submitted appropriate credentials (e.g., credentials to modify DNS records on the rule-based DNS resolution system 130, credentials for the hosting system 110, etc.), and to ensure that the rule is properly formatted (e.g., including valid criteria and resulting in valid DNS record when such criteria is satisfied).

At (4), the rule-based DNS resolution system 130 determines a source for information potentially satisfying the criteria specified within the rule. For example, the rule may specify the hosting system 110 as a source of configuration information. As another example, the rule may specify a messaging service configured (e.g., by the client device 102A) to hold messages including configuration information for the servers 112. In some instances, the rule may specify criteria other than a configuration of the servers 112, and as such, the rule may designate a source for information potentially satisfying the criteria, such as an RSS feed or other information stream. For the purposes of description of FIG. 3, it will be assumed that the information source corresponds to the hosting system 110. Accordingly, at (5), the rule-based DNS resolution system 130 subscribes to event notifications from the hosting system, for servers 112 managed by the hosting system 110 whose configuration may potentially satisfy the criteria specified within the rule. Illustratively, the hosting system 110 may enable authorized systems (e.g., the rule-based DNS resolution system 130) to request notifications regarding changes in configuration of one or more servers 112 associated with a specific user account, such as an account associated with the client device 102A. In some instances, these notifications may be pushed by the hosting system 110 directly to the rule-based DNS resolution system 130. In other instances, these notifications may be pushed by the hosting system 110 to an external messaging service, to which the rule-based DNS resolution system 130 can subscribe. Advantageously, these notifications may be generated by the hosting system 110 independently of operation of the servers 112, such as by the server manager 116, and thus, no modification of the operation of the servers 112 is required to transmit these notifications to the rule-based DNS resolution system 130.

Because it is possible that the criteria for the submitted rule is satisfied by a current configuration of one or more servers 112 within the hosting system 110, the rule-based DNS resolution system 130 further retrieves a current configuration of relevant servers 112 (e.g., servers 112 associated with an account of a client of the client device 102A). Illustratively, an event handler 140 or other component of the rule-based DNS resolution system 130 may retrieve a current configuration of the servers 112 and record that configuration in the server configuration data store 144. The current configuration may include any attributes of the servers 112, such as machine name, network address, service image used to implement a server 112, a region, a type (e.g., where the hosting system 110 uses a variety of different server types), tags for the server, network access information (e.g., port numbers or resource identifiers) for services implemented by the servers 112, etc. These attributes may also be referred to as "metadata" regarding a server 112.

At (7), the rule-based DNS resolution system 130 uses the retrieved configuration information to refresh DNS records associated with an account of the client device 102. Refreshing such DNS records may include determining whether the newly submitted rule requires creation of any new DNS records based on a current configuration of the hosting system 110. For example, the rule-based DNS resolution system 130 may determine, for each server 112 whose configuration was retrieved (e.g., for each server 112 associated with an account of the client device 102A), whether the configuration of the server 112 satisfies criteria for the newly submitted rule indicating that a new DNS record should be created for the server 112. If so, the rule-based DNS resolution system 130 may then create a DNS record for the server 112, according to criteria of the rule designating a domain name for the server 112. For example, where the rule specified that all servers corresponding to a specific service image, such as an image of software executable to implement a web hosting service, should be identified via domain name as "webserverN.clientdomain.tld," where N is a consecutively assigned number, the rule-based DNS resolution system 130 may identify, from the configuration information, all servers 112 associated with the specified service image, and generate DNS records associating network addresses of the servers with a domain name in the form of "web serverN.clientdomain.tld."

Refreshing such DNS records may further include determining whether existing DNS records associated with an account of the client device 102 are valid based on a current configuration. In one embodiment, the rule-based DNS resolution system 130 may initially perform a quick-check for validity of prior DNS records, by verifying that a retrieved configuration for a server 112 matches a last known configuration for the server as stored within the server configuration data store 114. If so, the rule-based DNS resolution system 130 may assume that prior DNS records are valid. Otherwise, or in the instance that a quick-check is not utilized, the rule-based DNS resolution system 130 may perform a full verification, by re-running all current rules associated with an account of the client device 102A against the configuration information, and regenerating all DNS records associated with the account of the client device 102A.

In one embodiment, each DNS record corresponding to or generated as a result of a rule may be tagged with an identifier of the rule (e.g., a globally unique identifier, or GUID). In the instance that rule is deleted (e.g., in response to a request of a client device 102), any rules tagged only with the GUID of the deleted rule may be deleted at the rule-based DNS resolution system 130, and the GUID of the deleted rule may be removed from all remaining DNS records. Thus, the rule-based DNS resolution system 130 may enable efficient garbage collection of DNS records.

In some instances, the rule-based DNS resolution system 130 may periodically refresh the DNS records for an account, to ensure that the rule-based DNS resolution system 130 and the hosting system 110 remain consistent and synchronized. For example, the rule-based DNS resolution system 130 may retrieve current configuration information from the hosting system 110 every threshold number of minutes, store the configuration in the server configuration data store 144, and recreate DNS records using such configuration information and associated rules (where recreating DNS records may occur in each instance that configuration information is retrieved, only when retrieved configuration information differs from a last known configuration, etc.). The periodicity of retrieval of the current configuration information and refreshing of DNS records may vary in different embodiments, and may be selected to balance minimization of errors with respect to DNS records and computing resources needed to retrieve current configuration information and refresh DNS records.

Because the hosting system 110 may operate to allow for rapid and dynamic reconfiguration of the servers 112, such as by creating or deleting servers 112 in response to manual commands, load balancing considerations, etc., it may be undesirable to await periodic refreshes at the rule-based DNS resolution system 130 in order to allow DNS records to reflect reconfiguration. Accordingly, the rule-based DNS resolution system 130 may utilize notifications of changes in configuration (e.g., configuration events) to modify DNS records appropriately, without awaiting a refresh of the DNS records. Illustrative interactions for utilizing notifications of changes in configuration to manage DNS records are depicted in FIG. 4.

Figure 4:
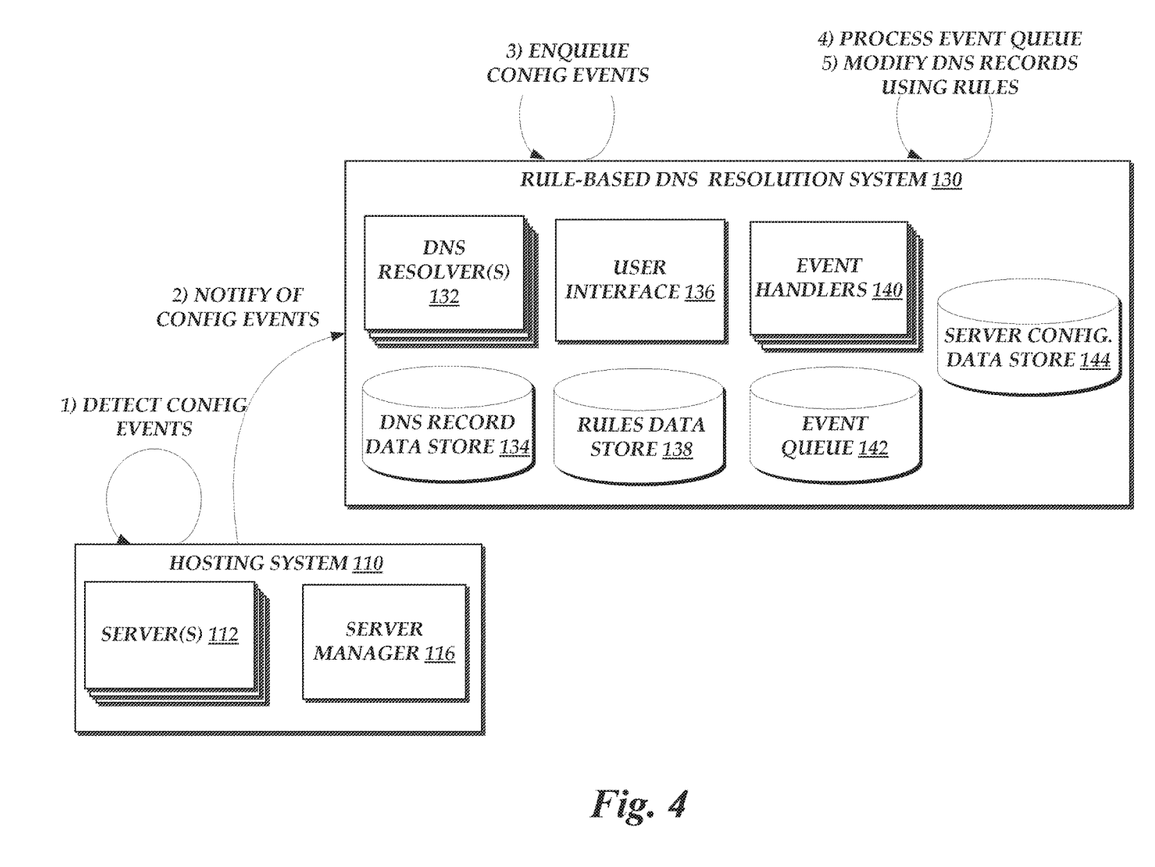
FIG. 4 is a block diagram depicting illustrative interactions to modify DNS records based on event notifications from a hosting system, using the management rules.

The interactions of FIG. 4 begin at (1), where the hosting system 110 detects events corresponding to changes in configurations of the servers 112. Illustratively, a change in configuration may include generation of a server 112, deletion of a server 112, or a modification of operation of a server 112. A change in configuration may be the result of manual input to the hosting system 110 (e.g., a request from a client device 102) or a result of automated management of the hosting system 110, such as automatic scaling of a pool of servers 112 providing a network-accessible service.

Thereafter, at (2), the hosting system 110 notifies the rule-based DNS resolution system 130 of the change in configuration events. Illustratively, the notifications may occur in accordance with prior instructions by the rule-based DNS resolution system 130 to the hosting system 110 to transmit notifications of configuration events, such as a request to subscribe to notifications regarding the servers 112. In one embodiment, the hosting system 110 may detect and transmit notifications regarding configuration events in aggregate. In another embodiment, the hosting system 110 may detect and transmit notifications regarding configuration events individually.

In some instances, the rule-based DNS resolution system 130 may operate to act immediately on reception of a notification of a configuration event. However, because the computing resources of the rule-based DNS resolution system 130 are typically limited, embodiments of the present disclosure may implement an event queue that enables incoming notifications to the rule-based DNS resolution system 130 to be queued for later processing at the rule-based DNS resolution system 130 (e.g., by the event handlers 140). Accordingly, at (3), the rule-based DNS resolution system 130 (e.g., via the user interface 136) enqueues the received configuration event notifications.

Thereafter, the event handlers 140 may act to process configuration events from the event queue, update configuration of a server 112 as recorded in the server configuration data store 144, and make modifications to DNS records as appropriate. For example, each event handler 140, at (4), may dequeue a configuration event from the event queue, update configuration of a server 112 as recorded in the server configuration data store 144, determine whether the change in configuration satisfies any established rule, and if so, generate a new DNS record in accordance with the rule. The event handler 140 may further determine whether the change in configuration indicates that a server 112 no longer satisfies an established rule, and delete or modify existing DNS records to remove network address information of the server 112 that was included in accordance with the established rule, at (5). For example, where the configuration event corresponds to deletion of a server 112, the event handler 140 may remove any network address of the server 112 from DNS records. Where a configuration event corresponds to migration of a server 112 from a first region to a second region, the event handler 140 may determine whether the server 112 previously satisfied a rule by virtue of its placement in the first region, and if so, remove network address information of the server 112 from the corresponding DNS record (and may also generate a new DNS record including that address information, if warranted by a rule for the server 112).

Thus, by virtue of the interactions of FIG. 4, changes in configuration of servers 112 at the hosting system 110 may be processed by the rule-based DNS resolution system 130 to automatically modify corresponding DNS records, such that no manual modification of the DNS records is required. Moreover, because the rule-based DNS resolution system 130 obtains configuration information from the hosting system 110, rather than from servers 112, the server 112 themselves may not be required to execute software to manage DNS records, of have knowledge of the rule-based DNS resolution system 130.

Figure 5:
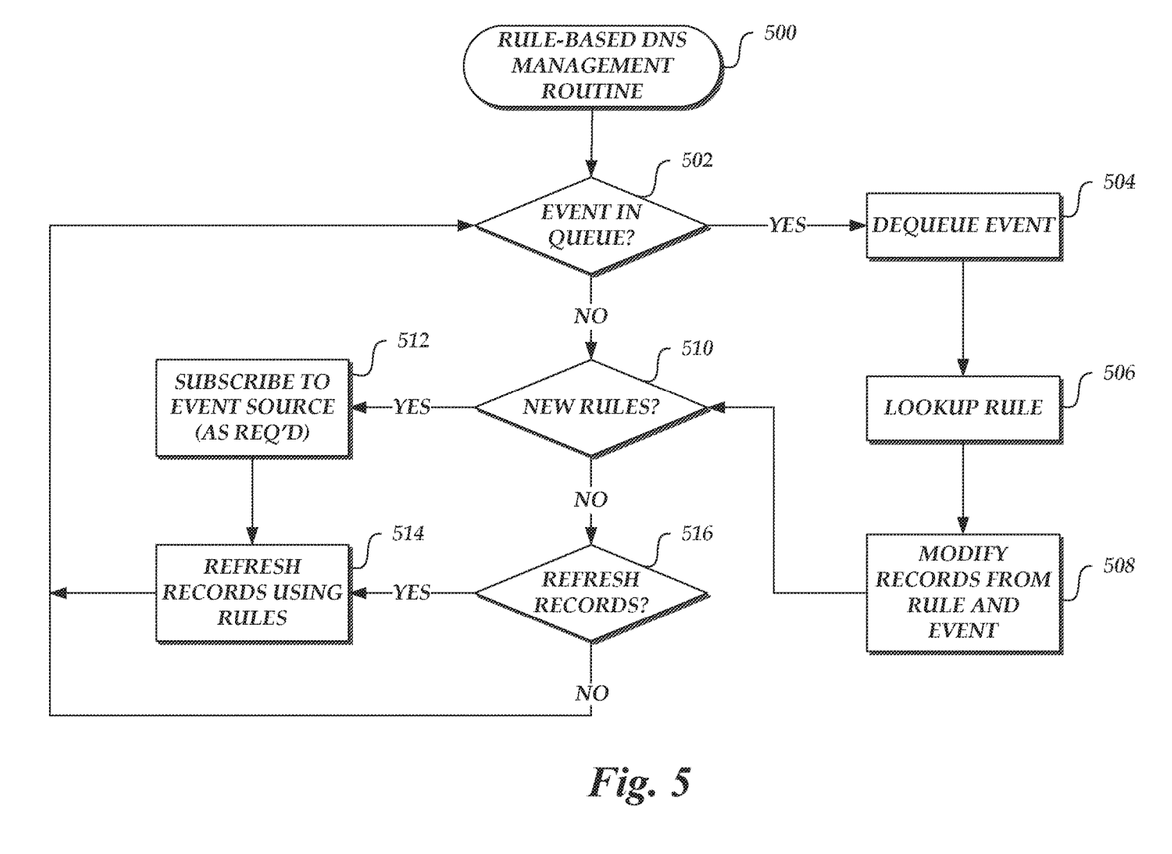
FIG. 5 is a flow chart depicting an illustrative routine for implementing rule-based DNS management.

With reference to FIG. 5, one illustrative routine 500 that may be implemented to implement a rule-based DNS resolution system based on configuration of servers to be identified within DNS records will be described. The routine 500 may be implemented, for example, by the rule-based DNS system 130 of FIG. 1 (e.g., via one or more event handlers 140 in conjunction with other components of the rule-based DNS system 130). For the purposes of illustration, the routine 600 will be described under the assumption that one or more rules exist at the rule-based DNS system 130, including criteria for identifying servers to which the rule applies, as well as criteria for generation of a DNS record for such servers. However, the routine 600 may also be implemented without reference to pre-existing rules.

The routine 500 at block 502, where the rule-based DNS system 130 determines whether any events exist within an event queue. As noted above, an event queue may be utilized to store information on events that could require modifications to DNS records, such as changes in a configuration of a set of servers identified within the DNS records. Where an event exists within the queue, the routine 500 continues to block 504, where the event is dequeued for processing. At block 506, the rule-based DNS system 130 determines whether the dequeued event corresponds to any pre-existing rule. For example, the rule-based DNS system 130 may determine whether the event corresponds to a change in configuration of a server to which a rule applies. In some instances, the rule-based DNS system 130 may determine whether the change in configuration indicates that a rule which previously applied no longer applies to a server based on a change in configuration (e.g., deletion of the server, migration of the server out of a specific region, etc.). In other instances, the rule-based DNS system 130 may determine whether a change in configuration indicates that a rule which did not previously apply would now apply to a server, based on the change in configuration. If one or more rules does apply to the event, the routine 500 continues to block 508, where DNS records are modified according to the event and the rule. Illustratively, modification of DNS records may include generation of new DNS records, addition of network address information of a server to DNS records, removal of network address information of a server to DNS records, or deletion of DNS records. As noted above, DNS records created in response to a rule, or that otherwise match a rule, may be tagged with an identifier of the rule to facilitate later garbage collection of the DNS records. In the instance that no rules apply to an event, or after modification of DNS records in accordance with an applicable rule, the routine 500 returns to block 502, where events can be dequeued (e.g., in parallel, in sequence, or a combination thereof) by event handlers, to modify DNS records in accordance with any changes to configuration of servers.

After processing of events within the queue, the routine 500 continues to block 510, where the rule-based DNS system 130 determines whether any change has occurred to the rules managed by the rule-based DNS system 130. Illustratively, a change to the rules may include submission of a new rule, modification of an existing rule, or deletion of an existing rule. In one embodiment, rules may be maintained separately for each client account, and thus, block 510 may be implemented on per-account basis. In another embodiment, rules may be maintained collectively, and block 510 may be implemented for the rule-based DNS system 130 as a whole.

Where a change in rules has occurred, the routine 500 continues to block 512, where the rule-based DNS system 130 modifies event sources, from which events are enqueued within the event queue, as required. For example, where a new rule is added that applies to certain servers of a hosting system (e.g., servers associated with a client account), the rule-based DNS system 130 may subscribe to a stream of event notifications for such certain servers. Where a rule is deleted for certain servers of a hosting system, and no other rule references the configuration of those servers as an event source, the rule-based DNS system 130 may unsubscribe to a stream of event notifications for those servers. In some instances, such as when a rule is modified to alter domain names within DNS records created by virtue of the rule, rather than the servers to which the rule applies, no change in event sources is required, and implementation of block 512 may be omitted.

The routine 500 then continues to block 514, where the rule-based DNS system 130 refreshes current DNS records to ensure compliance with the modified rules. Illustratively, where a new rule is added, the rule-based DNS system 130 may obtain a current configuration of servers to which the rule applies, and generate DNS records in accordance with the rule. Where a rule is removed, the rule-based DNS system 130 may delete DNS records created by virtue of the rule, and not otherwise required by other rules. As noted above, such deletion may be facilitated by tagging rules with identifiers of each rule requiring the DNS record, such that DNS records tagged with only an identifier of a deleted rule may be easily removed. Implementation of block 514 may further include verifying that currently maintained DNS records comply to a current set of rules. In one embodiment, this verification may correspond to a complete validation, by comparing current DNS records to a new set of DNS records, generated by retrieving a current configuration of servers to which the maintained rules apply, and reprocessing that configuration according to the maintained rules to generate the new set of DNS records. In the instance that the current DNS records and new set of DNS records match, the rule-based DNS system 130 may determine that the current DNS records are correct and verified. In the instance that current DNS records and the new set of DNS records do not match, the rule-based DNS system 130 may take corrective action, such as notifying an administrator (e.g., a client device 102) of the error, or replacing current DNS records with the new set of DNS records. In some embodiments, prior to executing a complete validation, the rule-based DNS system 130 may verify current DNS records by utilizing a quick validation, for example by determining that a retrieved configuration matches a last known configuration. In the instance that a quick validation fails, the rule-based DNS system 130 may implement a complete validation. In the instance that the quick validation succeeds, the rule-based DNS system 130 may proceed without a complete validation. Thereafter, the routine 500 can proceed to block 502, as described above.

Returning to the description of block 510, in the instance that no rule change has occurred, the routine can proceed to block 516, where the rule-based DNS system 130 determines whether a refresh of DNS records should occur. As noted above, refreshes may occur periodically to ensure that DNS records have not become invalid, which may occur for example where notifications regarding a change in configuration event have been lost due to network communication failures. If a refresh is required, the routine 500 proceeds to block 514, and then to block 502, as described above. If no refresh is required, the routine 500 may proceed directly to block 502.

Thereafter, the routine 500 may continue as an "infinite loop," executing during operation of the rule-based DNS system 130. Thus, the rule-based DNS system 130 may operate to continuously modify DNS records based on user-submitted rules, thereby automating creation of service discovery records in response to changes in configuration of servers providing network-accessible services.

In some embodiments of the present disclosure, various functionalities described with respect to the routine 500 may be implemented in parallel, or as separate routines. For example, blocks 502 through 508 may be implemented as a first routine (e.g., running continuously by event handlers 140), while the remaining blocks may be implemented as one or more additional routines (e.g., running by event handlers 140 in response to client submission of new rules, or periodically as refreshes to DNS records are required). Division of the routine 500 into multiple parallel routines may advantageously increase the speed of various functionalities of the routine 500, for example, where the rule-based DNS system 130 utilizes parallel processing techniques.

While embodiments are described above with respect to modification of DNS records based on rules, the rule-based DNS system 130 may further enable clients to submit rules to control other functions of the rule-based DNS system 130. For example, where the rule-based DNS system 130 implements health checking functionality, rules may specify, for an applicable server, what type of health check data should be sent to the server, the frequency that health check data should be submitted, how a response from the server should be evaluated, and under what criteria the server should be considered healthy or unhealthy. Thereafter, the rule-based DNS system 130 may process configuration events according to the health check rules, to create, modify, or delete health checks for a server in accordance with the rules. Moreover, the rule-based DNS system 130 may in some instances enable rules to specify how load balancing should be implemented at the rule-based DNS system 130. For example, a rule may specify, for a given server to which the rule applies, a weight that should be applied to the server by the rule-based DNS system 130 for load balancing purposes. Thus, embodiments described herein may modify any functionality of the rule-based DNS system 130.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for rule-based management of domain name system (DNS) records associated with a hosted virtual machine instance, the system comprising:
    a hosting system, comprising a physical processor, and configured with computer executable instructions to manage the hosted virtual machine instance, wherein the hosted virtual machine instance implements a network-accessible service and is associated with a network address at which the network-accessible service may be accessed; and
    a rule-based DNS resolver system, comprising a physical processor, and configured with computer executable instructions to:
        obtain a rule for establishing a DNS record, the rule including criteria for identifying virtual machine instances to which the rule applies and criteria for generation of a domain name to be included within the DNS record, wherein criteria for generation of the domain name specify the domain names based at least partly on respective software images used to generate the virtual machine instances to which the rule applies;
        obtain configuration information of the hosted virtual machine instance from the hosting system, the configuration information identifying a software image used to generate the hosted virtual machine instance;
        determine that the configuration information satisfies the criteria for identifying virtual machine instances to which the rule applies;
        generate the DNS record, where the DNS record includes information mapping the network address of the virtual machine instance to the domain name generated according to the criteria for generation of the domain name included within the rule, the domain name generated based at least partly on a software image used to generate the virtual machine instance; and
        respond to a client request to access the domain name by transmitting to a client device the DNS record.

2. The system of claim 1, wherein the rule-based DNS resolver system is further configured with computer executable instructions to:
    identify an information source for obtaining notifications regarding changes to the configuration information of the hosted virtual machine instance; and
    subscribe to the notifications regarding changes to the configuration information of the hosted virtual machine instance.

3. The system of claim 2, wherein the rule-based DNS resolver system is further configured with computer executable instructions to:
    obtain a notification indicating updated configuration information for the hosted virtual machine instance;
    determine that the updated configuration information does not satisfy the criteria for identifying virtual machine instances to which the rule applies; and
    delete the DNS record.

4. The system of claim 2, wherein the rule-based DNS resolver system is further configured with computer executable instructions to:
    obtain a notification indicating updated configuration information for the hosted virtual machine instance;
    determine that the configuration information satisfies the criteria for identifying virtual machine instances to which the rule applies;
    generate an updated DNS record, where the updated DNS record includes information mapping the network address of the virtual machine instance to an updated domain name generated according to the criteria for generation of a domain name included within the rule.

5. The system of claim 1, wherein the configuration information is obtained from a management device of the hosting system independent of the hosted virtual machine instance.

6. A computer-implemented method comprising:
  obtaining a rule for establishing a DNS record at a rule-based DNS resolver system, the rule including criteria for identifying network endpoints to which the rule applies and criteria for generation of a domain name to be included within the DNS record, wherein criteria for generation of the domain name specify the domain names based at least partly on respective software images used to generate the network endpoints to which the rule applies;
  obtaining configuration information of a network endpoint from a hosting system providing the network endpoint, the configuration information identifying a software image used to generate the network endpoint;
  determining that the configuration information satisfies the criteria for identifying network endpoints to which the rule applies;
  generating the DNS record, where the DNS record includes information mapping network access information of the network endpoint to the domain name generated according to the criteria for generation of the domain name included within the rule, the domain name generated based at least partly on the software image used to generate the network endpoint; and
  responding to a client request to access the domain name by transmitting to a client device the DNS record.

7. The computer-implemented method of claim 6, wherein the criteria for generation of the domain name further specifies the domain name based at least partly on at least one of respective locations of the network endpoints to which the rule applies, respective software executing on the network endpoints to which the rule applies, respective instance types of the network endpoint, or respective identifiers of the network endpoints to which the rule applies.

8. The computer-implemented method of claim 6 further comprising:
  identifying an information source for obtaining notifications regarding changes to the configuration information of the network endpoint; and
  subscribing to the notifications regarding changes to the configuration information of the network endpoint.

9. The computer-implemented method of claim 8 further comprising implementing a queue for storing the notifications regarding changes to the configuration information of the network endpoint.

10. The computer-implemented method of claim 9 further comprising:
  obtaining a notification indicating updated configuration information for the network endpoint;
  determining that the updated configuration information does not satisfy the criteria for identifying network endpoints to which the rule applies; and
  deleting the DNS record.

11. The computer-implemented method of claim 10, wherein obtaining the notification indicating the updated configuration information includes dequeuing the notification from the queue.

12. The computer-implemented method of claim 6, wherein the rule further includes criteria for selecting the network access information as a network address from a plurality of network addresses associated with the network endpoint, and wherein generating the DNS record includes selecting the network address according to at least the criteria for selecting the network address.

13. The computer-implemented method of claim 6, wherein the network endpoint provides a network-accessible service, and wherein the rule further includes criteria for selecting the network access information associated with the network endpoint, the network access information including at least one of a port number or a resource identifier associated with the network-accessible service.

14. The computer-implemented method of claim 6, wherein the rule further includes criteria for generating health checks for the network endpoint, and wherein the computer-implemented method further comprises transmitting instructions to a health checking system to implement health checks for the network endpoint in accordance with the criteria for generating health checks.

15. The computer-implemented method of claim 13, wherein the criteria for generating health checks includes at least one of criteria for determining health check data to be transmitted to the network endpoint, criteria for determine how frequently to transmit health checks, criteria for evaluating responses to health check data obtained from the network endpoint, or criteria for evaluating a status of the network endpoint based at least in part on the responses.

16. A system comprising:
  a data store including one or more rules, wherein individual rules of the one or more rules include criteria identifying network endpoints to which the individual rules apply and criteria for generation of domain names to be included within DNS records created according to the individual rules, wherein criteria for generation of the domain name specify the domain names based at least partly on respective software images used to generate the network endpoints to which the rule applies;
  a computing device, comprising a physical processor, and configured with computer-executable instructions to:
    obtain, from a hosting system, configuration information for a network endpoint hosted by the hosting system, the configuration information identifying a software image used to generate the network endpoint;
    determine that the configuration information satisfies the criteria for identifying network endpoints included in a first rule of the one or more rules;
    generate a DNS record in accordance with the first rule, where the DNS record includes information mapping a network address of the network endpoint to a domain name generated according to the criteria for generation of the domain name included within the first rule, the domain name generated based at least partly on the software image used to generate the network endpoint; and
    store the service record within a service record data store.

17. The system of claim 16 further comprising a service resolver system configured to:
  obtain a request for DNS records corresponding to the domain name; and
  in response to the request, transmit the DNS record.

18. The system of claim 16, wherein the configuration information is obtained from a management device of the hosting system independent of the network endpoint.

19. The system of claim 16, wherein the network address is an internet protocol (IP) address.

20. The system of claim 16, wherein the computing device is further configured with computer-executable instructions to obtain access to a queue of notifications from the hosting system, the notifications indicating changes to the configuration information for the network endpoint, and wherein the computing device is configured to obtain the configuration information at least in part by accessing a notification from the queue.

21. The system of claim 16, wherein the network endpoint corresponds to at least one of a physical server, a virtual machine instance executed on the physical server, a software container executed on the physical server, or a logical execution environment on the physical server.

\* \* \* \* \*